July 14, 1964

T. F. HUETER 3,141,148

UNDERWATER SOUND APPARATUS

Filed Dec. 27, 1960

INVENTOR.
THEODORE F. HUETER

BY *Omund Q Dahl*

ATTORNEY

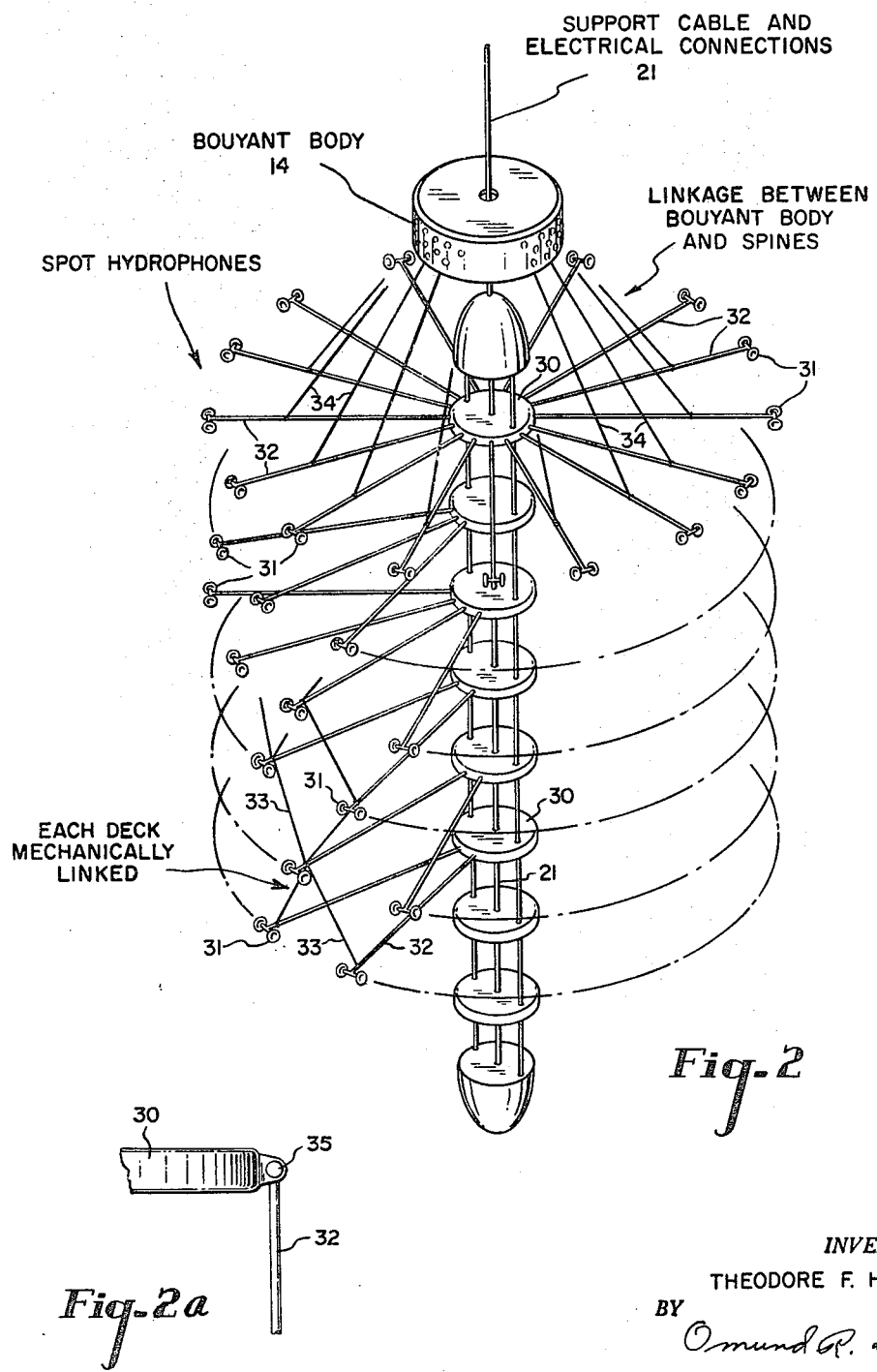

3,141,148
UNDERWATER SOUND APPARATUS
Theodore F. Hueter, Seattle, Wash., assignor to Minneapolis-Honeywell Regulator Company, Minneapolis, Minn., a corporation of Delaware
Filed Dec. 27, 1960, Ser. No. 78,724
13 Claims. (Cl. 340—9)

This invention is related to the field of underwater sound apparatus and is more particularly concerned with hydrophone arrays. The invention is especially directed toward hydrophone arrays which are expanded when lowered into the water and which is collapsed upon being retrieved from the water.

It is an object of this invention to provide a hydrophone array which in the unsubmerged state is collapsed and which upon being submerged into the water expands into a suitable usable condition.

It is a further object of this invention to provide a collapsible hydrophone array which is extended into suitable operating condition when submerged and which when the unit is again raised collapses to form a compact package.

These and other objects of the present invention will become apparent upon consideration of the accompanying specification, claims, and drawings of which:

FIGURE 2 is a diagramatic representation of another embodiment of my invention;

FIGURE 2a is an illustration of hinging means which may be used in my invention.

Figure 1:
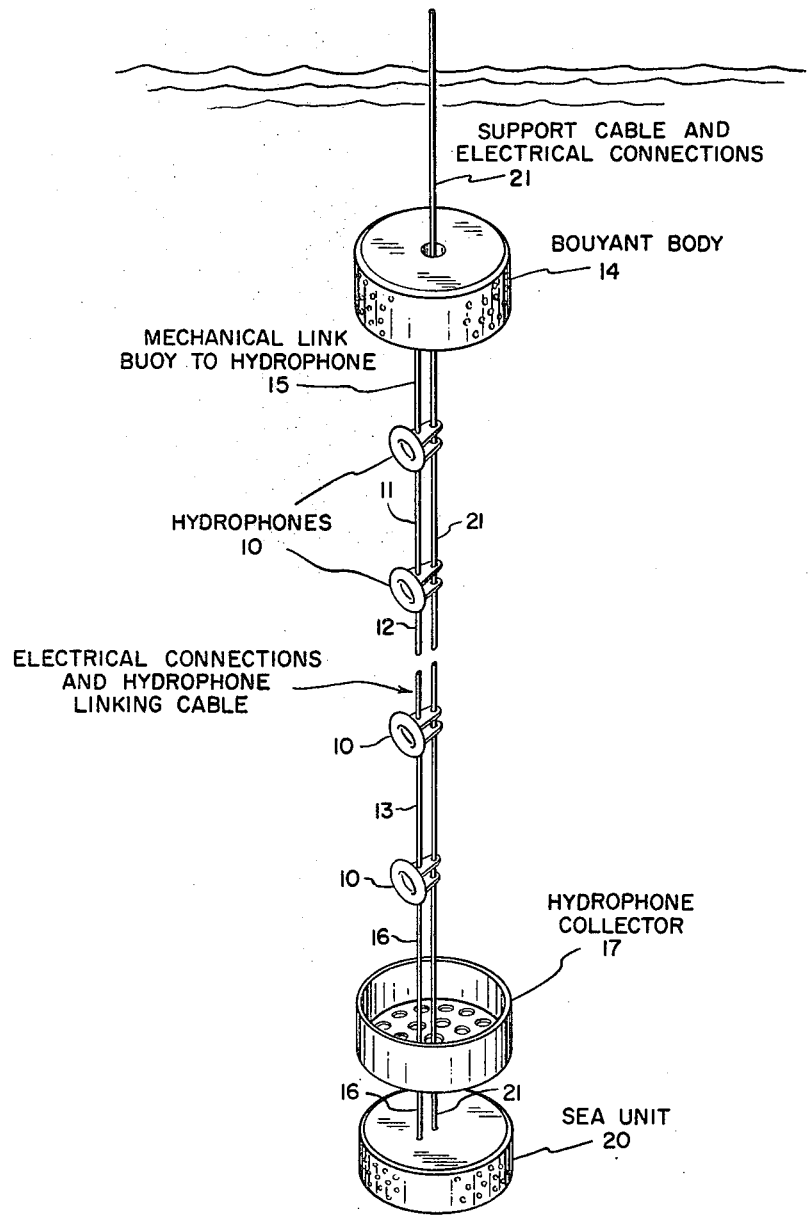
FIGURE 1 is a diagramatic representation of one embodiment of my invention.

Referring now to FIGURE 1, this hydrophone array employs a buoyant toroidal body mechanically linked to a string of hydrophones, each hydrophone being located a predetermined distance apart in the string, for example, about 25 feet apart may be suitable. The lower end of the hydrophone string is affixed to a heavy nonbuoyant sea unit weight.

Referring now to FIGURE 1 in detail there is shown a plurality of spaced hydrophones 10 which are mechanically linked together at predetermined spaced intervals by connections 11–13. The topmost hydrophone 10 is connected to a buoyant body 14 by a flexible cable 15. The lowest hydrophone 10 is mechanically linked by a connection 16 to a hydrophone collector 17 and nonbuoyant sea unit 20. The connections 11–13 and 16 comprise a mechanical link, such as a flexible cable, and electrical connections to the hydrophone units. A main support cable 21 which also includes the electrical connections from the hydrophones has its lower end secured to the sea unit 20 and the collector 17 may be fixed on the support cable slightly above the sea unit. The buoyant body 14 and the hydrophones 10 are constructed to be free to move along the main cable 21.

In operation when the unit is submerged the sea unit 20 sinks and the buoyant body 14 tends to rise extending the streamer of hydrophones 10 along the support cable, so that the multiple hydrophones operate at predetermined spaced depths beneath the surface. When the unit is raised, the hydrophone collector container 17 collects each hydrophone and then makes contact the buoyant body, the entire unit thus forming a compact package for ease of handling.

Referring now to the modification of FIGURE 2, there is generally disclosed a buoyancy operated umbrella type hydrophone array. The unit comprises an open coaxial array of a plurality of spaced power transducers 30 along a central column. The central column is surrounded by a folding umbrella type array of spot hydrophones. The hydrophone array, as disclosed, shows the extended position of six decks of hydrophones, each hydrophone supported on a spine 32 which spine is adapted to pivot with respect to the central column to which it is attached, for example, by means of the hinge means as shown in FIGURE 2a. In FIGURE 2a, spine 32 is adapted to pivot about a pin 35 which is mounted on power transducer 30. The supporting spines 32 may be linked within each deck and each deck is mechanically linked to the deck below by suitable linkage members 33. The uppermost hydrophone deck is mechanically linked by suitable members 34 to the buoyant body 14 which is free to move on the support cable 21 within the limits of the attached mechanical linkage. The central column is nonbuoyant.

As the collapsed hydrophone array is lowered into the water by its cable 21, the buoyant body 14 rises along cable 21 thereby extending the complete hydrophone array by reason of linking members 34 which extend the spines 32. When the array is removed from the water the buoyant body lowers and the array collapses against the central column to form a compact cylindrical unit. The positioning of the supporting spines 32 may be staggered from deck to deck to reduce the size of the cylinder when the array is collapsed.

It will be understood that modifications may be made in the design and arrangements of the various portions of my invention without departing from the spirit of my invention.

I claim:

1. A hydrophone array assembly adapted to be extended from a collapsed position to an extended operating position upon being lowered into the water comprising: a plurality of interconnected hydrophone means; nonbuoyant means; means connecting said plurality of hydrophone means to said nonbuoyant means to cause said assembly to sink; a buoyant member; means connecting said buoyant member to another portion of said hydrophone means whereby upon submerging said assembly into the water said buoyant member tends to rise with respect to said nonbuoyant means so that said plurality of hydrophone means are extended into operating position.

2. A hydrophone array assembly adapted to be extended from a collapsed position to an extended operating position upon being lowered into the water comprising: support cable means including nonbuoyant means attached thereto to cause said assembly to sink; a plurality of associated transducer elements; a buoyant member; means connecting said plurality of transducer elements to said buoyant member and to said nonbuoyant means whereby upon submerging said assembly into the water the buoyant body tends to rise with respect to said nonbuoyant means so that said plurality of transducer means are extended into proper operating condition.

3. A hydrophone array adapted to expand to an operating condition upon being submerged and to collapse upon being retrieved from the water comprising: a plurality of associated hydrophones; means mounting said hydrophones in an assembly which has a normally collapsed position; nonbuoyant means connected to said hydrophone assembly; a buoyant member; means connecting said buoyant member to said hydrophone assembly, said nonbuoyant means and said buoyant means being so connected to said hydrophone assembly that upon said array being lowered into the water the hydrophones are extended from their normally collapsed position to a proper extended operating condition.

4. A hydrophone assembly adapted to be extended from a collapsed position to an extended operating position upon being lowered in the water comprising: an array comprising a plurality of mechanically interconnected transducer means adapted to assume either a compact collapsed condition or an extended operating position; a relatively heavy weight mechanically connected to a first point on said transducer means array to cause said means to sink; a relatively light buoyant weight mechanically connected to another point on said transducer means array; cable means mechanically attached to said heavy weight to support said assembly and extending upwards to a craft so that upon said assembly descending into the water the buoyant weight tends to rise with respect to said heavy weight whereby said plurality of transducer means are extended into proper operating condition.

5. A hydrophone array assembly adapted to be extended from a collapsed position to an extended operating position upon being lowered into the water comprising; support cable means including nonbuoyant means attached to the lower portion thereof to cause said assembly to sink and also including a plurality of associated transducer means attached thereto; a buoyant member mounted on and free to move along the length of said cable means; means connecting said plurality of transducer means to said buoyant member whereby upon submerging said assembly into the water the buoyant body tends to rise along said cable means with respect to said nonbuoyant means so that said plurality of transducer means are extended into proper operating conditions.

6. A hydrophone array adapted to expand to an operating condition upon being submerged and to collapse upon being retrieved from the water comprising: a plurality of hydrophones; flexible mechanical means interconnecting said hydrophones in a string at spaced intervals; a support cable having nonbuoyant means and a hydrophone collector connected at the lower end thereof, said string of hydrophones having a normally collapsed condition within said hydrophone collector; means linking the lower end of said string of hydrophones to said collector; a buoyant member; means connecting said buoyant member to the other end of said hydrophone string, so that upon said array being lowered into the water the hydrophones are extended from their normally collapsed position to a proper extended operating condition.

7. A hydrophone array adapted to expand to an operating condition upon being submerged and to collapse upon being retrieved from the water comprising: a support cable having nonbuoyant means and a hydrophone collector connected at the lower end thereof; a plurality of hydrophones; flexible mechanical means interconnecting said hydrophones in a string at spaced intervals, said string of hydrophones having a normally collapsed condition within said hydrophone collector; means linking the lower end of said string of hydrophones to said collector; a buoyant member connected to and freely movable along said support cable; means connecting said buoyant member to the upper end of said hydrophone string, so that upon said array being lowered into the water the hydrophones are extended from their normally collapsed position by said buoyant member to a proper extended operating condition.

8. A hydrophone array adapted to expand to an operating condition upon being submerged and to collapse upon being retrieved from the water comprising: a support cable having nonbuoyant means and a hydrophone collector connected at the lower end thereof; a plurality of hydrophones; flexible mechanical means interconnecting said hydrophones in a string at spaced intervals therealong; means connecting each of said hydrophones in slidable contact along said support cable said string of hydrophones thereby having a normally collapsed condition within said hydrophone collector; means linking the lower end of said string of hydrophones to said collector; a buoyant member connected to and freely movable along said support cable; means connecting said buoyant member to the upper end of said hydrophone string, so that upon said array being lowered into the water the buoyant member rises with respect to said collector and said hydrophones are extended from their normally collapsed position to the proper spaced interval operating condition.

9. A hydrophone array assembly adapted to be extended from a collapsed position to an extended operating position upon being lowered into water, comprising:
    a buoyant member;
    a plurality of hydrophone means, one of said plurality of hydrophone means mechanically connected to said buoyant member;
    first cable means, mechanically and electrically connecting said plurality of hydrophone means at predetermined spaced intervals;
    second cable means, mechanically and electrically connecting one of said plurality of hydrophone means to said nonbuoyant means;
    third cable means, electrically and mechanically connected to said nonbuoyant means, so arranged that said plurality of hydrophone means and said buoyant member may slide along the length thereof.

10. An energy sensor array adapted to be extended from a collapsed storage configuration to an elongated operating configuration upon being lowered into water, comprising:
    first support means incorporating electrical conductors;
    a buoyant member, slideable along said first support means;
    collector means, slideable along the length of said first support means;
    a nonbuoyant member, mechanically and electrically connected to said first support means;
    a plurality of energy sensor means, slideable along said first support means;
    first connector means, mechanically linking one of said plurality of energy sensor means to said buoyant member;
    second connector means, electrically connecting together said plurality of energy sensor means and said nonbuoyant member, and mechanically linking together said plurality of energy sensor means, said collector means, and said nonbuoyant member in a predetermined space relationship.

11. A transducer array assembly adapted to be extended from a collapsed position to an open operating position upon being lowered into water, comprising:
    support cable means, having an upper and a lower end;
    a nonbuoyant central column attached to the lower end of said support cable means;
    a plurality of transducer elements;
    a plurality of interconnected supporting spines each having a first portion pivotally connected to said central column and each having a second portion connected to one of said plurality of transducer elements;
    a buoyant member;
    means mechanically linking said buoyant member to said plurality of spines, whereby upon submerging said assembly into the water said nonbuoyant central column tends to sink with respect to said buoyant member so that said plurality of transducer elements are extended into open operating positions.

12. A transducer array adapted to be extended from a collapsed position to an open operating position upon being lowered into water, comprising:
    support cable means;
    a nonbuoyant central column attached to said support cable means;
    a plurality of support spines spaced on said central column, each one of said plurality of support spines having a first end and a second end, said first end pivotally connected to said central column;
    a transducer element mechanically connected to said second end of each one of said plurality of support spines;
    a buoyant member connected to said support cable means and free to slide therealong;

means mechanically connecting said buoyant member to said plurality of spines so that upon submerging said array into the water said nonbuoyant central column tends to sink with respect to said buoyant member whereby said plurality of support spines are raised and extended into operating position.

13. An energy sensor array assembly adapted to be extended from a collapsed position to an extended operating position upon being lowered into a predetermined fluid medium, comprising:

support cable means;

a central column, nonbuoyant in the predetermined fluid medium, attached to one end of said support cable means; a plurality of support elements spaced on said central column and pivotally connected thereto;

a plurality of energy sensors, each sensor connected to one of said plurality of support elements;

a member, buoyant in the predetermined fluid medium, slideably connected to said support cable means;

means mechanically linking said buoyant member to said plurality of support elements, so that upon submerging said assembly into the predetermined fluid medium said nonbuoyant central column tends to sink with respect to said buoyant member, whereby said plurality of energy sensors are extended into operating position.

No references cited.